Feb. 23, 1971     H. L. RHODES     3,566,302
LASER OPTICAL CAVITY AND ALIGNMENT METHOD
Filed Sept. 23, 1966

INVENTOR.
Henry L. Rhodes
BY
Attorneys

United States Patent Office 3,566,302
Patented Feb. 23, 1971

3,566,302
LASER OPTICAL CAVITY AND
ALIGNMENT METHOD
Henry L. Rhodes, Berkeley, Calif., assignor, by mesne assignments, to Spectra-Physics, Inc., a corporation of California
Filed Sept. 23, 1966, Ser. No. 581,556
Int. Cl. H01s 3/05, 3/02; G02b 5/08
U.S. Cl. 331—94.5
12 Claims

ABSTRACT OF THE DISCLOSURE

Laser optical cavity and method of alignment utilizing reflectors mounted on substrates having a hemispherical form and set into rigid structure for supporting the substrate and permitting it to be adjusted into alignment to form a portion of an optical cavity. A sealant having a plastic and a rigid state is disposed between the substrate and the support so that by exciting the laser and simultaneously shifting the substrate while the sealant is in a plastic state, an incipient laser beam can be developed and maximized, after which the sealant is caused to assume its rigid state and maintain the substrate and associated reflector in the aligned position.

This invention relates to reflectors forming an optical cavity for use in lasers and to an alignment method therefor.

Heretofore, lasers have utilized reflectors at each end of a tube containing a laser medium. The reflectors cooperate to define an optical cavity through the medium. When such reflectors have been mounted externally of the tube, radiation is passed to and from the tube through windows set at the Brewster angle. In general, it is preferred to eliminate such windows since they tend to absorb power and also to plane polarize the output light.

It is also known to eliminate the windows by mounting the reflectors directly to tube ends as with adjustable bellows. Such end mounted reflectors have created problems in adjusting and maintaining alignment. Adjustable bellows are expensive and tend to out-gas in operation, shortening the life of the apparatus. Where the reflectors have been integrally formed and sealed into the ends of the tube, final alignment has been achieved by bending the completed tube. Such bending decreases the cross-section through the tube and the number of passes the light beam cam make through the tube. This condition creates a manufacturing problem since in some tubes the cross-section within a tube is so eclipsed that laser action cannot be achieved. Tubes that have been aligned by bending have often had to be rebent in order to establish alignment after being subjected to vibration, shock, or temperature changes in use. There is, therefore, a need for a new and improved apparatus forming reflectors for a laser optical cavity and alignment method therefor.

In general, it is an object of the present invention to provide a laser optical cavity and alignment method which will overcome the above named disadvantages and limitations.

Another object of the invention is to provide a laser optical cavity and alignment method of the above character which is inexpensive to manufacture and which does not require readjustment thereafter.

Another object of the invention is to provide a laser cavity and alignment method of the above character in which the plasma confining tube is not bent to align the same, but is supported rigidly to prevent bending, especially as encountered in use.

Another object of the invention is to provide a laser optical cavity and alignment method of the above character which permits alignment of the cavity by monitoring actual laser output during manufacture.

Another object of the invention is to provide a laser optical cavity and alignment method which gives an increased and maintainable power output for a given set of physical parameters.

These and other objects of the invention will be apparent from the following description and claims when taken in conjunction with the accompanying drawings, of which:

In general, the laser apparatus and alignment method of the present invention incorporates a rigidly mounted plasma tube for containing a laser medium, generally gaseous. Each end of the tube opens into a spherically shaped socket or receptacle adapted to receive a substrate. The socket and substrate are provided with mating spherical surfaces so that the substrate can be shifted for alignment. Each substrate is provided with an optically ground surface having a partially reflecting coating thereon for reflecting light energy along the tube. When mounted the substrates form an optical cavity through the tube.

A layer of sealant is interposed between the mating surfaces of the socket and substrate. The sealant is a material which is plastic during the alignment of the substrates and which sets up afterwards to form a rigid seal between the parts. While the sealant is plastic, the laser tube is evacuated, filled with a laser medium and excited to create a population inversion and an incipient laser beam. The substrates are then shifted to maximize the intensity of the incipient beam which is a direct indication of the alignment. After alignment the sealant is allowed to harden to thereby fix the position of the substrates. Preferred sealants include a high vacuum wax and epoxy cement.

Figure 1:
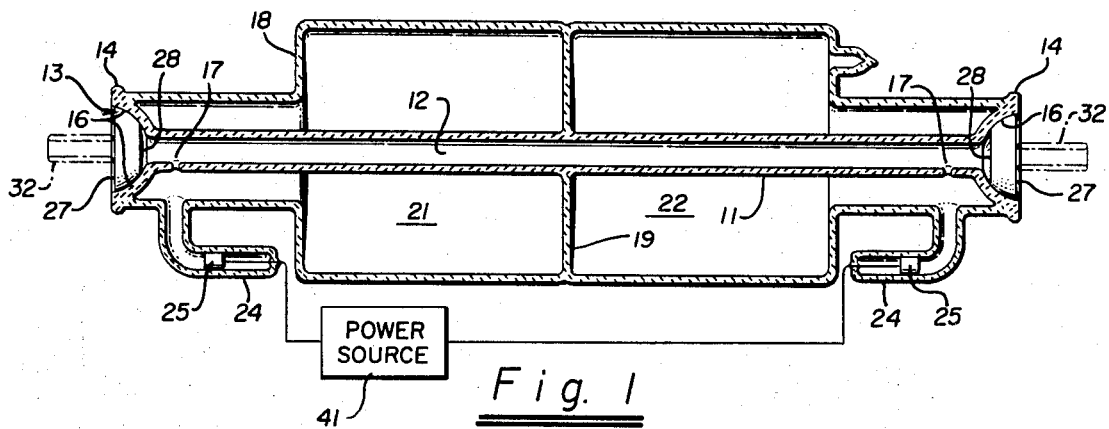
FIG. 1 is a longitudinal view in cross section of a laser optical cavity constructed according to the invention.
Figure 2:
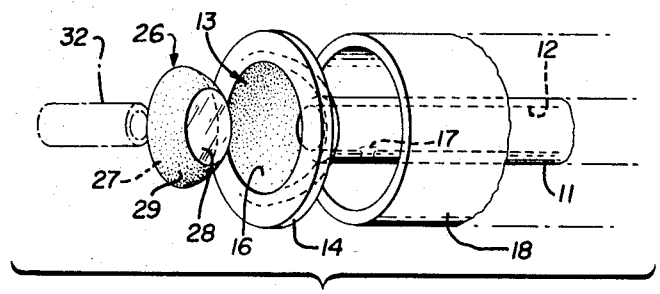
FIG. 2 is an exploded view of one end of the laser of FIG. 1.
Figure 3:
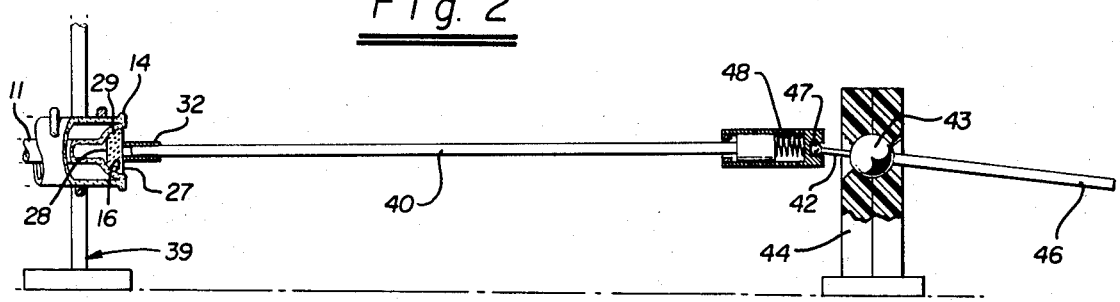
FIG. 3 is a longitudinal view partly in cross section showing the alignment of the laser cavity of FIG. 1.

Referring more particularly to FIGS. 1–3, the laser optical cavity includes a plasma tubing 11 for containing a laser medium 12 therein. The tubing 11 is dimensioned to support laser action for the selected laser medium. Each end of tubing 11 communicates with a receptacle or a socket 13 which is flared outwardly and terminates in a rim 14 having a greater diameter than the tubing. Socket 13 is spherically shaped, that is to say, is shaped as a female portion of a ball and socket joint common to laboratory glassware. The inner surface 16 of the socket is formed in a concave-spherical shape and is roughened to facilitate a seal with a mating part, as hereinafter described. A passageway 17 is formed in the tubing 11 adjacent each of the sockets 13, for permitting gases to be passed into and out of tubing 11 and for permitting an electrical discharge through the length of the tubing as hereinafter explained.

A second tubing 18 of greater diameter than tubing 11, and of approximately the same length, is coaxially mounted thereabout and is fused at each end to the rim 14 of the adjacent socket 13. A circular disk 19 is fused transversely between tubing 11 and tubing 18 and midway between their ends. Disk 19 serves to divide the outer region between the tubings into separate regions 21, 22 so that discharge will only take place through tubing 11 as hereinafter explained. Disk 19 also cooperates with the tubing 11, 18 to support tubing 11 at its midpoint and thus provide a rigid unitary structure which prevents tubing 11 from being bent. Each of regions 21, 22 is connected to and communicates with an electrode arm 24 which contains a suitable electrode 25 sealed therein by conventional glass-metal seal, a ceramic cold cathode electrode being illustrated in the drawing.

A solid glass transparent substrate 26 is provided for closing each end of plasma tube 11 and is shaped generally in the form of a segment of a sphere, i.e., the part of a sphere lying between two generally parallel planar surfaces cutting the sphere. Thus, substrate 26 is bounded by spaced generally parallel surfaces 27, 28 connected by spherically convex surface 29 adapted to mate with the concave spherical surface 16 of socket 13 such that surface 28 faces into tubing 11. Surface 28 of the substrate is coated with an optically reflective coating suitable for reflecting electromagnetic energy back along tubing 11.

Surface 28 of the substrates may be curved or plane so as to form any of the common optical cavities used in lasers, as, for example, hemispherical, (one surface spherical—the other plane) confocal (both spherical), or plane parallel.

Each substrate 26 is adjustably secured into one of the sockets by a high vacuum sealant 31 which is plastic during alignment of the substrate 26, and which sets into a rigid form after alignment. One preferred system includes the use of a vacuum wax capable of becoming plastic when heated, of simultaneously maintaining a high vacuum seal in the ground glass joint between the substrate 26 and socket.

One wax that has been found especially suitable is sold under the trade designation Apiezon-W, by Shell Companies of Great Britain. It is characterized by low vapor pressure (suitable for use in high vacuum systems) and a relatively high softening temperature (80–90° C.) which is above the temperature encountered by the substrate 26 when the laser is in operation. The softening temperature should be above about 75° C. Below the softening temperature the wax becomes hard and non-plastic.

The wax sealant, substrate 16 and socket 13 are heated and the sealant flowed about the convex surface 29 of the substrate. Substrate 26 is then pressed into the socket so that the wax is uniformly distributed between surfaces 16 and 29 to form a seal therebetween. Where Apiezon-W wax is utilized, its dark color renders the seal effected between the substrate and the socket easily visualized since that area where contact is established becomes darkened.

To facilitate handling of the substrate and later adjustment, a short section 32 of glass tubing is adhered to surface 27 with a suitable adhesive which can later be dissolved so that the section 32 can be removed after alignment is completed.

The completed laser of FIG. 1 is connected to a vacuum system, sealed, pumped down to $10^{-7}$ to $10^{-8}$ torr and out-gassed by conventional means such as applying RF heating to the various parts, including the electrodes. After out-gassing, the tube is filled with a suitable gaseous lasing mixture, for example helium/neon gas mixture in the ratio of about 7 to 1 a pressure of about 2 millimeters. It will be appreciated that the invention described herein is not limited to specific laser media, but is of general application. Thus, the helium/neon mixture herein disclosed is intended to be only representative of a suitable laser medium.

Referring now to FIG. 4 there is shown by way of example the alignment apparatus utilized in the invention. Thus, alignment is performed by rigidly clamping the laser onto a stand 39 and inserting a lever arm 40 into section 32 at one end of the laser. The laser is connected to a source 41 of electrical power and a discharge formed between electrodes 25. The discharge passes from each electrode arm 24 into one of regions 21, 22, through passageway 17 and along the length of tubing 11 to crease a population inversion in the laser medium therein and consequent incipient laser beam.

This laser beam is observed in the form of spots of light (red, for He/Ne mixture) along the longitudinal axis of the tubing 11 and is viewable by the operator from the end opposite the connected lever arm 40. The intensity of the spots is maximized by heating the wax sealant and adjusting substrate 26. Adjustment is conveniently done by connecting the lever arm 40 to a movable short lever arm 42 mounted to a ball 43 pivotally secured in a nylon block 44. Ball 43 is movable by handle 46 connected to ball 43 opposite to arm 42. Arms 40, 42 are connected by free fitting pivot 47. A spring loaded coupling 48 maintains engagement between the lever arm 40 and the tubing 31 while the arms are moved.

After maximizing the intensity of the incipient beam, lever arm 40 is connected to the other end of the laser and the above procedure is repeated. Depending upon the cavity mirror configuration, the above steps are repeated at each end again until no further increase of the laser beam intensity is obtained. Generally speaking, in a hemispherical arrangement, one set of alignment steps is usually sufficient. After the laser is aligned the substrates can be sealed with an epoxy cement to permanently fix the reflector alignment, after which the laser is flushed, pumped down and refilled with fresh laser medium. The last step is advantageous in removing any materials that may have been outgassed from the sealant or pulled through it, when heated.

Another preferred system uses an epoxy cement as the sealant 31. The epoxy cement is chosen to have a satisfactorily low vapor pressure and reasonably long setting time (1–2 hours) so that sufficient time is available for adjusting the substrates. One suitable epoxy cement is that available under the designation Torrseal, from Varian Associates, Vacuum Products Division, Palo Alto, Calif. With epoxy cement as the sealant, the alignment procedure is the same as that hereinbefore described except that complete outgassing is deferred until after alignment is completed, and before final filling of the completed tube.

From the foregoing, it will be apparent that the invention disclosed herein has solved a problem that has existed in the industry and will be of great value in securing optimum performance from the optical cavity of a laser. By using the invention, a laser cavity can be inexpensively manufactured and aligned by monitoring actual laser output from the device during its manufacture.

To those skilled in the art to which this invention relates, many changes and differing embodiments and applications will suggest themselves without departing from the spirit and scope of the invention. For example, although a specific alignment apparatus is illustrated for carrying out the method of the invention, it will be understood that other apparatus may be substituted. In fact any apparatus capable of accurately shifting the substrates can be used.

Likewise, while there has been disclosed epoxy cement and a hardenable wax as sealants, many other suitable sealant materials may suggest themselves. For example, sealant 31 can have only a plastic state, and the position of the aligned substrate can be fixed by applying a cement bead about the periphery of surface 27 to thereby rigidly join substrate 26 and socket 13 together.

Accordingly, it should be understood that the disclosures and descriptions herein are illustrative of the invention and are not intended to be taken as a limitation thereon.

I claim:

1. In a method for aligning a laser optical cavity consisting of means connecting opposite ends thereof and including spherical substrate support sockets disposed at each end for mounting reflector means including a substrate having a mating periphery for permitting said substrate to be adjusted to a position of alignment as a portion of said optical cavity, the steps of mounting said substrate in said support socket, applying a sealant between said substrate and said support socket, said sealant having a plastic state and a rigid state, disposing a laser medium in said cavity, exciting said medium to obtain incipient laser action while simultaneously shifting said substrate as said sealant is in a plastic state until the incipient laser action fully developed and a maximum laser output beam is obtained, and subsequently causing said substrate to maintain a fixed position by causing said sealant to assume a rigid state.

2. A method as in claim 1 in which said sealant is a vacuum wax which becomes plastic when heated above a predetermined temperature and further including the step of heating the wax to above said predetermined temperature to cause the wax to enter the plastic state and to permit shifting of the substrate.

3. A method as in claim 1 in which said wax becomes plastic at a temperature above about 75° C.

4. A method as in claim 1 in which said sealant is a cement which is initially plastic to permit adjustment of the substrates and which permanently hardens after such adjustment.

5. A laser cavity comprising means forming a rigid structure having spaced ends and including spherical support sockets positioned at each of said ends, substrates including a means forming optical reflective surfaces, said substrates and support means having mating surfaces for permitting continuous angular adjustment of said substrates within said support socket, means interconnecting said substrates and support socket, said last named means having a plastic state to permit adjustment of said substrate and a rigid state for fixing said adjustment.

6. A laser as in claim 5 wherein said vacuum sealant is a high vacuum wax which becomes plastic when heated.

7. A laser as in claim 5 wherein said vacuum sealant is a cement which is plastic when applied to permit adjustment of the substrates and which subsequently sets to fix such adjustment.

8. A laser comprising means forming a rigid structure having spaced ends, means forming hemispherical sockets at each of said ends, each of said sockets having a passageway opening inwardly toward the other to define a light path therebetween, a pair of substrates having one side thereof in the form of a hemispherical ball and disposed in one of said sockets to form a portion of a ball and socket joint, reflector means carried by each of said substrates for reflecting light back and forth between said ends when said substrates are aligned, means for interconnecting said substrates and said sockets, the last named by means having a plastic state for permitting adjustment of said substrate in the socket and a rigid state for fixing such adjustment, a laser medium disposed between said ends and in the light path between said sockets, means for exciting said laser medium, said substrates being adjusted when said interconnecting means is in a plastic state to obtain a maximum laser beam output, after which the interconnecting means is caused to assume a rigid state to fix such adjustment.

9. A laser as in claim 8 wherein said sockets open and face outwardly away from each end and each other so that said substrates are supported against being drawn inwardly.

10. A laser as in claim 8 in which said medium is a gaseous medium and in which said rigid structure and said ball and socket joints form a gastight envelope, said medium being excitable by an electron discharge, means for forming an electron discharge within said gas, and a capillary extending between said ends and defining a path for said discharge.

11. A laser comprising a first elongate tubing forming an outer envelope of said laser, electrodes sealed to opposite ends of said tubing, a second elongate tubing having a cross sectional dimension less than the first tubing and a comparable length, said second tubing mounted within the first tubing the adjacent ends of each of said tubings being connected and fused together to form a first closed region surrounding said second tubing, said ends of said second tubing terminating in an outwardly flared socket having an inner generally hemispherical surface, a disk transversely positioned and fused between said first and second tubings and intermediate their ends, said disk cooperating with said first and second tubings to support them as a rigid unitary structure, and dividing said first enclosed region to prevent electrical discharge therethrough, a pair of substrates each formed with a peripheral surface for mating with said inner surface of a socket, each of said substrates having a reflecting surface, and adapted to fit onto the ends of said second tubing to close the same and to define a second region including an optical cavity therethrough, said second tubing having an opening adjacent to each end for providing a gas passageway between said first and second regions, a vacuum sealant interposed between each substrate and the second tubing, said vacuum sealant having a plastic state to permit adjustment of said substrates and alignment of said optical cavity, and further having a rigid state to fix said alignment, a laser medium disposed with said first and second regions, and an electrical power source connected to said electrodes for creating an electrical discharge therebetween and through said openings and said second region.

12. A laser as in claim 11 wherein each end of said second tubing terminates in an outwardly flared socket having an inner generally hemispherical surface, and wherein each substrate is formed with a hemispherical surface for mating with said inner surface.

References Cited
UNITED STATES PATENTS

| | | | |
|---|---|---|---|
| 3,427,564 | 2/1969 | Okaya et al. | 331—94.5 |
| 3,390,351 | 6/1968 | Bell | 331—94.5 |

OTHER REFERENCES

Zaitsev: "Balljoint for the Adjustment and Fixing of Mirrors and Windows of a Gas Laser" (In Russian) Pribary i Tekhnika Experimenta, No. 3, May-June 1966, pp. 214–15.

Zaitsev: "Balljoint for the Adjustment and Fixing of Mirrors and Windows of a Gas Laser," Journal of Experimental Techniques, 1967, pp. 736–7.

Physics Abstracts, vol. 70, No. 834, June 1967, abstract No. 16157.

Vacuum Waxes, Apiezon, in Fisher Scientific Co.'s Modern Laboratory Appliances, 1963, cover page and p. 899.

Smartt et al.: "On the Production and Use of the Optical Contact Bond," J. Sci. Instr., vol. 41, 1964, p. 514.

RONALD L. WIBERT, Primary Examiner

R. J. WEBSTER, Assistant Examiner

U.S. Cl. X.R.

248—481; 350—27, 178, 288, 289

UNITED STATES PATENT OFFICE
CERTIFICATE OF CORRECTION

Patent No. 3,566,302      Dated February 23, 1971

Inventor(s) Henry L. Rhodes

It is certified that error appears in the above-identified patent and that said Letters Patent are hereby corrected as shown below:

COLUMN 5, line 43:

After "named" delete "by".

COLUMN 6, line 6

After "first" delete "closed" and insert --enclosed--.

Signed and sealed this 3rd day of August 1971.

(SEAL)
Attest:

EDWARD M. FLETCHER, JR.
Attesting Officer

WILLIAM E. SCHUYLER, JR.
Commissioner of Patents